United States Patent

[11] 3,584,662

| [72] | Inventors | Thomas W. Mattox<br>7205 Marley Circle, Charlotte, N.C. 28214;<br>John R. Mattox, Route 3, Box 208-A, Charlotte, N.C. 28207 |
|---|---|---|
| [21] | Appl. No. | 882,059 |
| [22] | Filed | Dec. 4, 1969 |
| [45] | Patented | June 15, 1971 |

[54] RETAINING NUT FOR INFLATION SHAFT OF TIRE BUFFING MACHINE
8 Claims, 3 Drawing Figs.

[52] U.S. Cl. ........................................... 141/98, 51/237, 141/326, 141/369
[51] Int. Cl. ......................................... B65b 1/04, B65b 3/04
[50] Field of Search............................................ 141/1, 4, 38, 98, 346—350, 369—381, 390, 392, 325, 326, 327, 328; 157/1; 137/230; 51/324, 237

[56]  References Cited
UNITED STATES PATENTS

| 2,864,444 | 12/1958 | Glodde.......................... | 51/237 |
| 2,893,172 | 7/1959 | Schrank ........................ | 51/324 |

Primary Examiner—Houston S. Bell, Jr.
Attorney—B. P. Fishburne, Jr.

ABSTRACT: A retaining nut for the threaded end of a hollow inflation shaft in a tire-buffing machine or the like carries an adjustable valve element or seal which closes the bore of the inflation shaft so as to permit inflation of the tire on such shaft only when the retaining nut is fully and firmly seated in full screw-threaded engagement with the shaft. Less than full engagement of the screw threads will prevent inflation of the tire as a safety feature.

PATENTED JUN 15 1971 3,584,662
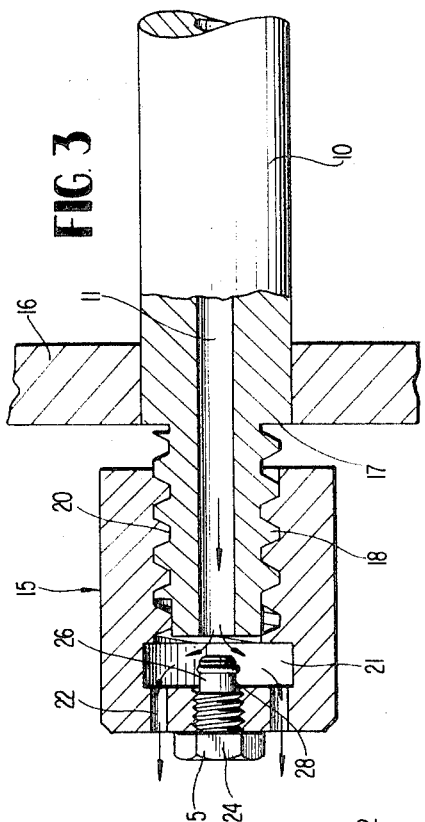
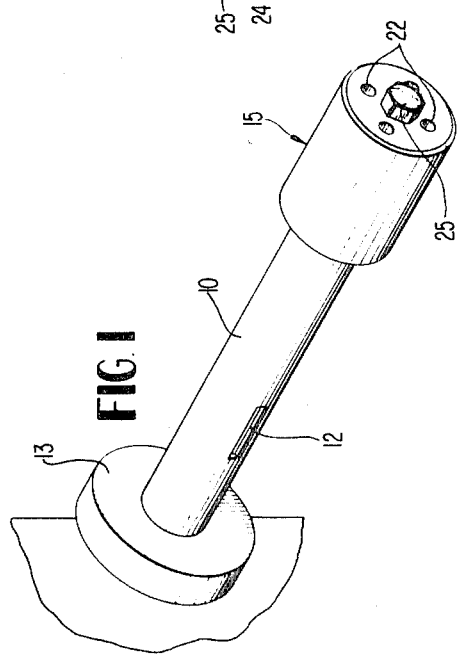
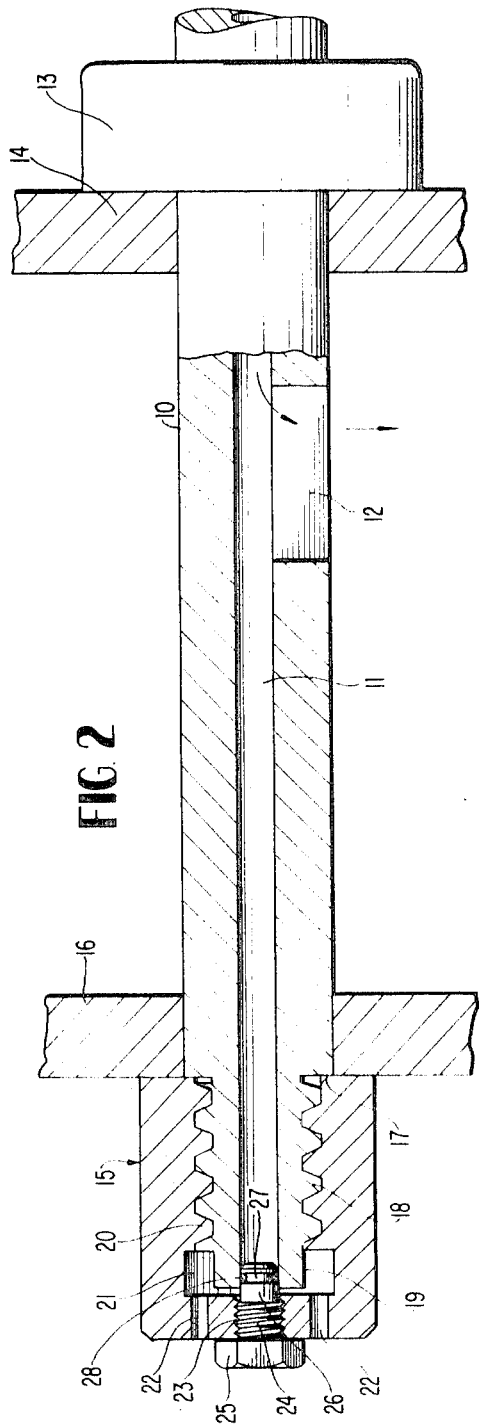
INVENTORS
JOHN R. MATTOX
THOMAS W. MATTOX
BY B. P. Fillum
ATTORNEY

RETAINING NUT FOR INFLATION SHAFT OF TIRE BUFFING MACHINE

Pneumatic tire-buffing machines and certain tire builders and other similar tire machines have shafts upon which the tire is mounted during processing and through which inflating air is conveyed to the tire. The inflating shaft of the machine carries a retaining nut at one end which serves to couple the parts securely so that the tire mounting can resist the heavy pressure caused by inflation. Frequently, because of carelessness or oversight, the machine attendant may fail to tighten the retaining nut fully on the inflation shaft, leaving only partial thread engagement between the shaft and nut. Subsequently, when the tire is inflated, the screw threads may be warped and damaged or may even strip as where only a few threads are engaged and this can produce a highly dangerous situation.

In accordance with the invention, the retaining nut for the inflation shaft is equipped with air bleed openings and an adjustable valve or seal for the bore of the inflation shaft. The bore remains unsealed and open until the retaining nut is fully tightened down or seated against the shoulder of the shaft. Only when this is accomplished is the bore of the shaft firmly sealed so that compressed air cannot escape and the tire may be inflated. If the nut is less than fully seated, the inflating air may escape from the shaft bore and pass to atmosphere through the vent openings of the nut.

Other features and advantage of the invention will be apparent during the course of the following description.

BRIEF DESCRIPTION OF DRAWING FIGURES

FIG. 1 is a fragmentary perspective view of a safety retaining nut embodying the invention as applied to an inflating shaft of a tire buffer or the like.

FIG. 2 is an enlarged central vertical section through the shaft and retaining nut and associated elements with the nut fully seated and the shaft bore sealed to allow tire inflation.

FIG. 3 is a similar sectional view showing the retaining nut only partially applied to the shaft so as to allow escape of the inflating air through the nut.

DETAILED DESCRIPTION

Referring to the drawings in detail, wherein like numerals designate like parts throughout the same, the numeral 10 designates a tire-mounting shaft of a tire-buffing machine or a similar piece of equipment where the tire must be mounted and inflated during the processing thereof. In any event, the shaft 10 has a central bore 11 through which compressed air is delivered to an outlet slot 12 in communication with the interior of the tire, not shown, mounted on the shaft 10. The shaft may have a fixed abutment or collar 13 thereon, as shown, to position the hub 14 of one tire-retaining head or plate and a retaining nut 15, forming part of the subject matter of this invention, abuts and positions the companion tire-retaining head 16, as shown in FIG. 2. The elements 14 and 16 are removably mounted on the shaft 10.

The shaft 10 has an annular shoulder 17 near one end thereof and outwardly of this shoulder has reduced diameter screw threads 18 which terminate near the end of the shaft, leaving a short cylindrical portion 19 free of threads and being of the diameter of the root of the threads.

The retaining nut 15 may be cylindrical, as shown, and is preferably knurled to facilitate turning by hand. The nut has internal screw threads 20 to receive the male threads 18 of the shaft and an undercut annular recess 21 near the outer end of the nut surrounds the portion 19, FIG. 2, when the nut is firmly seated against the shoulder 17 with the threads 18 and 20 fully engaged. The nut has plural air vent openings 22 formed through its outer end and communicating with the recess 21.

At the center of the nut in alignment with the bore 11, the outer end wall of the nut has a screw-threaded opening 23 receiving adjustably a screw 24 having an exterior head 25 and an inner reduced diameter pin portion 26 of a proper size to enter the bore 11. The portion 26 has a groove 27 formed therein receiving an o-ring seal 28 adapted to form an airtight seal with the bore 11 upon entering such bore as depicted in FIG. 2. When the seal 28 is clear of the bore 11, FIG. 3, the compressed air is free to escape from the bore to the recess 21 and flows around the screw 24 to the ports 22 and then to atmosphere.

The device continues a safety seal and retaining nut for the shaft 10 in the following manner. When the operator of the buffing machine or like tire machine requiring tire inflation fails to turn the nut 15 fully against the shoulder 17 and produces only partial thread engagement, FIG. 3, the seal 28 will not engage the bore 11 of the shaft and the air will escape through the nut and the tire cannot be inflated. On the other hand, when the attendant takes care to thread the nut 15 fully onto the shaft 10 and against the shoulder 17, FIG. 2, the seal 28 will enter and seal the bore 11 and the air cannot escape and the tire will be inflated. With full thread engagement, there is no danger to the operator or to the machine.

The screw 24 itself may be adjusted within the nut to position the seal 28 within very narrow limits rendering the device even more safe.

It is to be understood that the form of the invention herewith shown and described is to be taken as a preferred example of the same, and that various changes in the shape, size and arrangement of parts may be restored to, without departing from the spirit of the invention.

We claim:

1. In a tire-processing machine, a tire-supporting and inflation shaft having a bore through which inflating air is introduced into the tire and said bore opening through one end of the shaft, said shaft having screw threads formed on said one end and having an abutment shoulder at the inner terminal of the screw threads a retaining nut having threaded engagement with the screw threads of the shaft and adapted to engage said shoulder when fully threaded onto the shaft, said nut having vent passage means leading to atmosphere and adapted to communicate with the bore of the shaft, and a sealing element for the bore of the shaft secured to the nut coaxially with the bore and entering and sealing the bore only when the nut is substantially fully threaded onto the shaft and substantially engaging said shoulder, the sealing element being removed from the bore so that air can escape through the nut whenever the nut is spaced from said shoulder substantially.

2. The structure of claim 1, and said sealing element is a screw having threaded engagement with the nut and being adjustable relative to the nut, and a seal carried by the screw and adapted to enter said bore.

3. The structure of claim 2, and said screw having an unthreaded terminal portion provided with an annular groove, and said seal being a ring seal seated in said groove and adapted to enter the shaft bore snugly.

4. The structure of claim 3, and said ring seal being a rubberlike seal.

5. The structure of claim 2, and said nut having an outer end wall provided with a central screw-threaded opening receiving said screw, and said seal adapted to project axially inwardly of said end wall for entry into the shaft bore.

6. The structure of claim 5, and a turning head on the screw exteriorly of said nut.

7. The structure of claim 6, and said vent passage means comprising a plurality of vent openings in the end wall of the nut surrounding the screw-threaded opening of the end wall.

8. The structure of claim 7, and said nut having an annular chamber communicating with the vent openings immediately inwardly of the end wall.